(12) United States Patent
Patwardhan et al.

(10) Patent No.: US 10,764,859 B2
(45) Date of Patent: *Sep. 1, 2020

(54) ASSIGNING A SUBSET OF ACCESS POINTS IN A WIRELESS NETWORK TO A HIGH PRIORITY

(71) Applicant: Hewlett Packard Enterprise Development LP, Houston, TX (US)

(72) Inventors: Gaurav Patwardhan, Santa Clara, CA (US); Sachin Ganu, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,109

(22) Filed: Dec. 1, 2018

(65) Prior Publication Data

US 2019/0104495 A1    Apr. 4, 2019

Related U.S. Application Data

(63) Continuation of application No. 15/954,024, filed on Apr. 16, 2018, now Pat. No. 10,154,471, which is a
(Continued)

(51) Int. Cl.
*H04W 40/00* (2009.01)
*H04W 64/00* (2009.01)
(Continued)

(52) U.S. Cl.
CPC ......... *H04W 64/003* (2013.01); *H04W 16/18* (2013.01); *H04W 24/04* (2013.01); *H04W 52/0274* (2013.01); *H04W 88/08* (2013.01)

(58) Field of Classification Search
CPC ... H04W 88/08; H04W 88/085; H04W 88/10; H04W 88/18; H04W 92/02; H04W 92/04;
(Continued)

(56) References Cited

U.S. PATENT DOCUMENTS 7,916,708 B2    3/2011   Hart
8,345,599 B2    1/2013   Famolari et al.
(Continued)

OTHER PUBLICATIONS

Pulkkinen, T., et al.; "Awesom: Automatic Discrete Partitioning of Indoor Spaces for Wifi Fingerprinting"; Jun. 2012; 19 pages.
(Continued)

*Primary Examiner* — Huy C Ho
(74) *Attorney, Agent, or Firm* — Hewlett Packard Enterprise Patent Department

(57) ABSTRACT

Example method includes: determining, by a network device, a plurality of client devices' locations within a wireless network; assigning the plurality of client devices into a number of clusters; calculating an original cluster centroid location for each cluster of client devices; calculating an average distance between each client device in a particular cluster and the original cluster centroid location for the particular cluster; iteratively adjusting the number of clusters and assignment of the plurality of client devices to determine the number of clusters associated with a low number of cluster and a low average distance from each client device in a respective cluster to a respective cluster centroid location; and assigning a subset of access points in the wireless network to a high priority, each AP in the subset having the closest distance to the respective cluster centroid location corresponding to the determined number of clusters.

20 Claims, 5 Drawing Sheets

Related U.S. Application Data continuation of application No. 15/610,319, filed on May 31, 2017, now Pat. No. 9,974,043.

(51) Int. Cl.
*H04W 16/18* (2009.01)
*H04W 24/04* (2009.01)
*H04W 88/08* (2009.01)
*H04W 52/02* (2009.01)

(58) Field of Classification Search
CPC ... H04W 92/045; H04W 92/10; H04W 92/12; H04W 92/14; H04W 92/18; H04W 92/20; H04W 92/22; H04W 92/24; H04W 16/18; H04W 16/20; H04W 16/22; H04W 16/225
USPC ...................................................... 455/456.1
See application file for complete search history.

(56) References Cited

U.S. PATENT DOCUMENTS

| | | |
|---|---|---|
| 8,380,220 B2 | 2/2013 | Alles |
| 8,983,470 B1 | 3/2015 | Ryan et al. |
| 8,994,591 B2 | 3/2015 | Dupray |
| 9,225,602 B2 | 12/2015 | Mettu et al. |
| 9,326,294 B2 | 4/2016 | Tang |
| 9,578,487 B2 | 2/2017 | Ganu |
| 2012/0170471 A1 | 7/2012 | Brown et al. |
| 2013/0024579 A1 | 1/2013 | Zhang et al. |
| 2013/0231132 A1 | 9/2013 | Huang |
| 2014/0113674 A1* | 4/2014 | Joseph ............. H04W 4/021 455/519 |
| 2014/0269614 A1* | 9/2014 | Maguire ............. H04W 4/80 370/331 |
| 2014/0359626 A1 | 12/2014 | Guedalia et al. |
| 2016/0219581 A1* | 7/2016 | Tang ................. H04W 72/10 |
| 2016/0227369 A1 | 8/2016 | Gao et al. |

OTHER PUBLICATIONS

Extended European Search Report received for EP Patent Application No. 17198669.8, dated Jan. 16, 2018, 10 pages.

* cited by examiner

ASSIGNING A SUBSET OF ACCESS POINTS IN A WIRELESS NETWORK TO A HIGH PRIORITY

This application is a Continuation of U.S. patent application Ser. No. 15/954,024 (now U.S. Pat. No. 10,154,471), filed on Apr. 16, 2018, which is a Continuation of U.S. patent application Ser. No. 15/610,319 (now U.S. Pat. No. 9,974,043) filed on May 31, 2017, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

When a customer wireless network is deployed, the access points (APs) are normally deployed to cover the entire coverage area. While such deployment provides service to all enterprise clients, day-to-day wireless client behaviors are quite different and have to be handled on the fly. Thus, some APs are associated with a higher priority than other APs due to their client serviceability. The list of these high priority APs keeps changing depending on the time and circumstances. Currently, no method is developed to prioritize APs into different priority layers in order to apply certain properties.

BRIEF DESCRIPTION OF THE DRAWINGS

The following detailed description references the drawings, wherein.

DETAILED DESCRIPTION

Figure 1A:
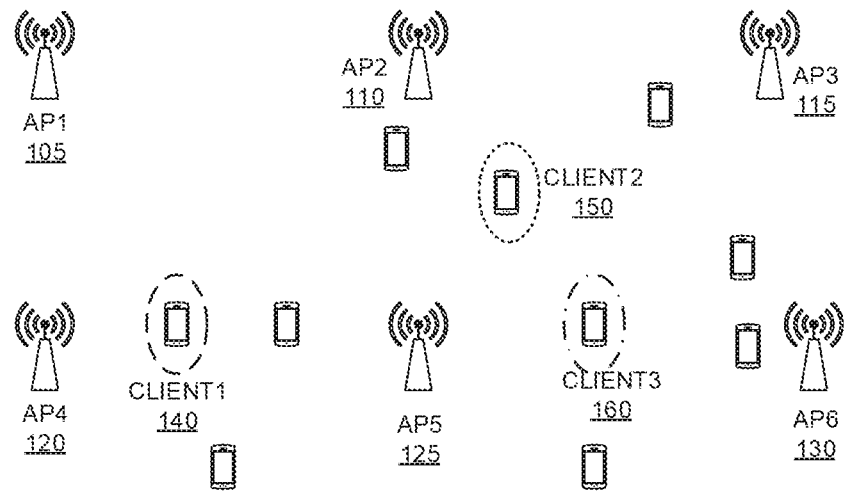
FIGS. 1A-1E are block diagrams of example mechanisms for assigning a subset of access points in a wireless network to a high priority.

Examples described herein include a method and system for assigning a subset of access points in a wireless network to a high priority. In particular, an example network device can determine a plurality of client devices' locations within a wireless network. Then, the network device can assign the plurality of client devices into a number of clusters. Furthermore, the network device can calculate an original cluster centroid location for each cluster of client devices. Then, the network device can also calculate an average distance between each client device in a particular cluster and the original cluster centroid location for the particular cluster. Next, the network device can iteratively adjust the number of clusters and assignment of the plurality of client devices to determine the number of clusters associated with a low number of cluster and a low average distance from each client device in a respective cluster to a respective cluster centroid location. Finally, the network device can assign a subset of access points in the wireless network to a high priority, such that each AP in the subset has the closest distance to the respective cluster centroid location corresponding to the determined number of clusters.

Examples in the present disclosure generally disclose a method to prioritize APs into different layers in order to apply certain properties. This method can be broadly subdivided into two approaches. First, an example system can determine which APs should be selected into the high priority layer. Second, the example system can determine how many APs should be selected into the high priority layer. These determinations are made based on specific context of the network, and can be changing depending on the current state of the network and the wireless client devices.

Note that, when a group of high priority APs is created, the remaining group of APs would form a low priority group. That low priority group of APs can also be used in certain key areas. A few examples of the uses of the high priority APs and low priority APs are given below as an illustration. Many more example scenarios can similarly benefit from the priority layering approach disclosed herein.

In some examples, the network may turn off the radios on the APs belong to the lower priority group in order to reduce the electric usage. During off peak operation hours, a selected subset of high priority APs may be sufficient to provide quality network service. Therefore, turning off the radios on the remaining low priority APs can save power.

In some examples, the radios of the low priority APs may be turned off to preserve the client roaming while achieving coverage balance. If there are very few active APs, then the wireless network may not provide sufficient network coverage for the client devices. On the other hand, if there are too many active APs, the network might suffer from roaming issues. Therefore, the example system can select the right number of APs to be given a high priority, such that the network will not suffer from extensive client roaming and also provides sufficient coverage.

In some examples, the example system can create certain traffic and QoS profiles for APs in the high priority layer. For example, the higher priority layer can be a proxy for the APs residing in places with higher client density. The client density may be similar for day-to-day events. However, the client density might change during special events, e.g., a company-wide town hall meeting, where a large number of client devices are closely located within a single area.

In some examples, certain APs in the higher priority layer can have high priority in selecting channels from a group of feasible channels. Sometimes, a smart phone device may not support certain wireless channels, which happen to be the operating channel of a nearby AP. As a result, the smart phone device would be connected to a faraway AP, which reduces the throughput for other client device connected to the faraway AP. With the solution described herein, the nearby AP would be given a high priority. Therefore, the nearby AP can select a wireless channel that associated client devices (e.g., the smart phone device) support.

Currently, the information that can be used to determine an AP's priority is local to each AP. At most, current systems can try to determine a set of neighboring APs and using additional information obtained from the neighboring APs. However, even with the additional information from the neighboring APs, current systems do not take into consideration locations of client devices.

The example method disclosed herein generally uses client devices as inputs to K-means clustering computation. The k-means clustering computation can produce a center-of-mass location of the client devices' locations. These client devices' locations represent a zone of maximum influence. Generally, the APs in that zone are the ones to be assigned with a high priority. The K-means clustering computation is used here for illustration purposes only. Other appropriate clustering method can also be used. The example method also has the advantage of having centralized information regarding to a client device's location, an AP's location and signal strengths corresponding to the connections between the AP and the client device.

In some examples, the example method can be used in a periodic fashion. In other examples, the example method may be invoked during specific events (e.g., a town hall meeting) when the client devices are concentrated in certain areas which is not seen in day-to-day client behaviors.

FIGS. 1A-1E are block diagrams of example mechanisms for assigning a subset of access points in a wireless network to a high priority. According to examples of the present disclosure, the following information is considered as given. First, each AP's location is known by a co-ordinate system, for example, as shown by X and Y co-ordinates. In FIGS. 1A-1E, a plurality of such APs are shown, including AP1 105, AP2 110, AP3 115, AP4 120, AP5 125, and AP6 130. Second, each client device's location is known by a co-ordinate system as well. For illustration purposes, ten client devices are depicted in FIGS. 1A-1E.

Table 1 below shows a theoretical method assigning a subset of access points in a wireless network to a high priority.

TABLE 1

Begin Method:
m = number of client devices
K = number of cluster centroids or number of APs to assign
to a single layer of priority.
L = list of APs.
p% = error applicable in the centroid location (e.g., 5%).
max_STA = maximum number of client devices serviced per AP
(e.g., 20).
for loop for number of K from num(L)/max_STA to num(L):
   random initialization for j = 1 to 100 //used for
   removing local optima issues
      Randomly initialize K cluster centroids mu(1),
      mu(2), ..., mu(K) such that each represents an
      STA.
      Repeat until distance between previous and
      current centroid is less than p%:
         for i = 1 to m:
            c(i):= index (from 1 to K) of cluster
            centroid closest to x(i)
            //Each client device is assigned to a
            cluster with the closest centroid.
         for n = 1 to K:
            mu(n):= centroid of points assigned to
            cluster n //The previous assumption of
            the centroid location is corrected by
            the client devices already assigned to
            the clusters, i.e., a centroid for a
            cluster is computed.
      mu(n) = {l | l belongs to L and l is closest to
      mu(n) } // Fit or truncate the centroid to the
      closest AP.
      Compute avg_distance = sum(dist of each STA with
      its centroid AP ) / number of client devices.
   Choose the lowest avg_distance amongst all "j" random
   iterations and store in db (mu, avg_distance, K)
Normalize avg_distance for entries in db
for all entries in db:
   Create a new value per entry called score =
   normalized_avg_distance * K
Sort using score and get the solution with the lowest score
// lowest score gives the best solution with regard to
client distances and the number of APs powered up.
End Method:

At the end of the computation shown in Table 1, the system can determine a number of APs by which maximum client devices are affected. Note that the computation above runs over a single radio frequency domain. As such, it can be scalable, because radio frequency domains in a wireless network deployment are generally within tens to hundreds of APs.

FIGS. 1A-1E shows the computation in Table 1 through a detailed example. The APs and client devices are shown for illustrated purposes only. Any number of APs and client devices can be deployed to utilize the method described herein to determine a subset of high priority APs in the similar fashion.

Referring now to FIG. 1A, in this example, AP1 105 to AP6 130 are deployed in a wireless network, serving ten client devices as depicted. First, the system determines a number K. Specifically, K indicates the number of cluster centroids or the number of APs to assign to a single layer of priority. In the example shown in FIGS. 1A-1E, a K value of 3 is used for illustration purposes. A network administrator can determine the K value dynamically or statically depending on the network's conditions and configurations. With K=3, the system then can select three random client devices as the original cluster centroids. For example, Client1 140, Client2 150 and Client3 160 are selected as the original cluster centroids. All ten client devices in the network will be clustered into one of the three clusters.

Figure 1B:
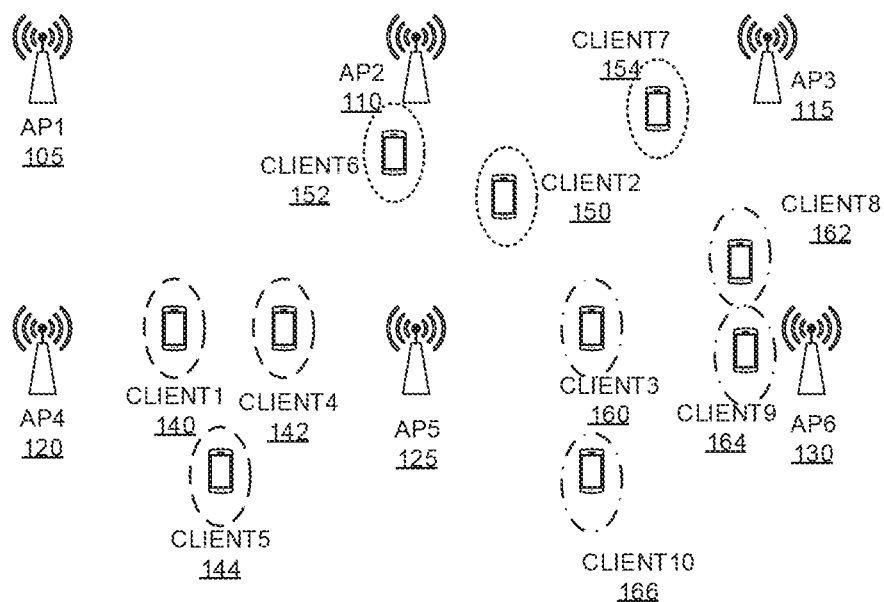

Referring now to FIG. 1B, as a next step, each client device is assigned to a cluster based on the closest centroid. For example, Client 4 142 and Client5 144 are assigned to be in the same cluster with Client 1 140, because Client1 140 is the closest cluster centroid (as compared to Client 2 150 and Client3 160) to Client4 142 and Client5 144. Similarly, Client6 152 and Client7 154 are assigned to be in the same cluster with Client2 150. Also, Client8 162, Client9 164, and Client10 166 are assigned to be in the same cluster with Client3 160.

Figure 1C:
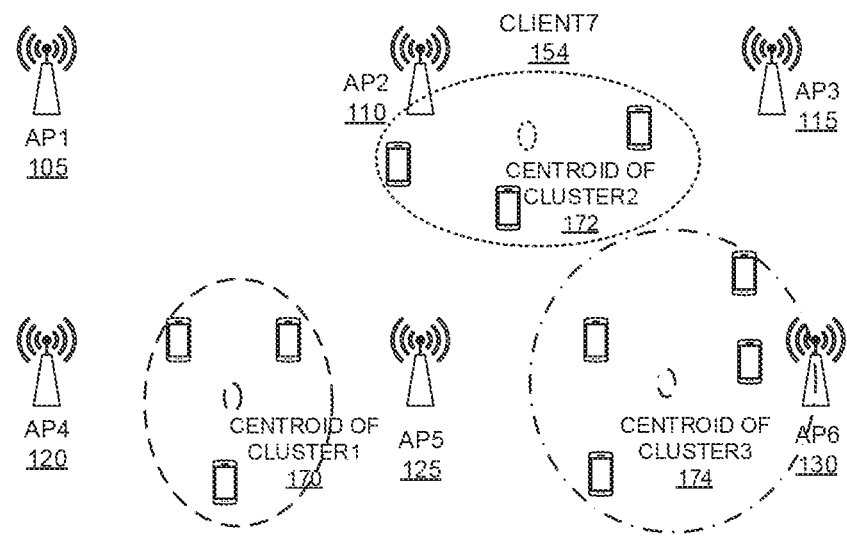

Referring now to FIG. 1C, after all client devices in the network are assigned to a cluster, the system can proceed to compute a centroid for each cluster of client devices. In this example, the cluster of Client1 140, Client4 142 and Client5 144 has centroid of cluster1 170; the cluster of Client2 150, Client7 152 and Client8 154 has a centroid of cluster2 172; and, the cluster of Client3 160, Client8 162, Client9 164, and Client10 166 has a centroid of cluster3 174.

Note that the computed centroid location for each cluster may be different from the original cluster centroid. This is because the original cluster centroid locations are randomly selected to be co-located with K number of random client devices. On the other hand, the computed cluster centroid location corresponds to the middle of each cluster of client devices. As used herein, a cluster centroid generally refers to a vector containing one number for each variable, where each number is the mean of a variable for the observations (e.g., client device location coordinates) in that cluster. The centroid can be used as a measure of the cluster location. For a particular cluster, the average distance from the centroid is the average of the distances between each client device and the centroid. The maximum distance from the centroid is the maximum of the distances between each client device and the centroid.

Figure 1D:
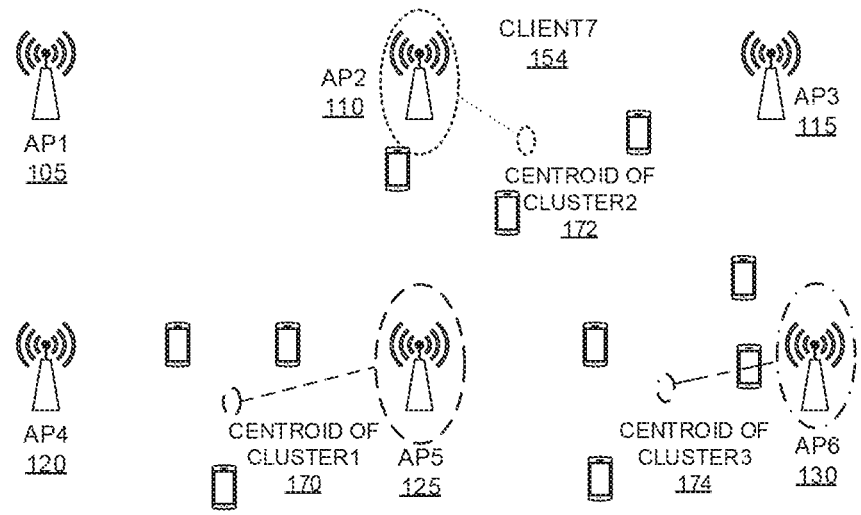

Thereafter, the cluster membership of each client device is computed again based on the distance from each client device's location to a centroid location. This loop of membership computation followed by new centroid location computation is carried on until the previous and the current computation's distance differs by less than or equal to a threshold percentage (p %). At this stage, the computed centroids are shown in FIG. 1D as centroid of cluster1 170, centroid of cluster2 172, and centroid of cluster3 174. Next, the locations of the virtual centroids (e.g., centroid of cluster1 170, centroid of cluster2 172, and centroid of cluster3 174) are truncated to a real AP, such that the closest AP to each centroid is marked as associated with the centroid. In FIG. 1D, AP5 125 is the closest AP to centroid of cluster1 170, and thus is marked as associated with centroid of cluster2 172. AP2 110 is the closest AP to centroid of cluster2 172, and thus is marked as associated with centroid of cluster2 172. Moreover, AP6 130 is the closest AP to centroid of cluster3 174, and thus is marked as associated with centroid of cluster3 174.

Figure 1E:
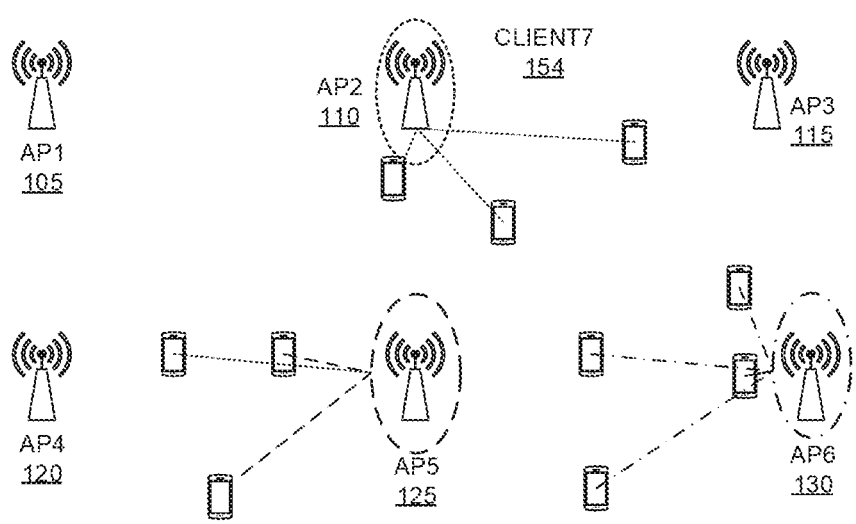

Next, the metric of average distance per client device to the corresponding centroid is computed as shown FIG. 1E. There are three APs in FIG. 1E, each of which corresponds to a respective client device cluster. For AP5 125, the average of distance between the three closest client devices in the cluster and AP5 125 is computed. Similarly, for AP2 110, the average of distance between the three closest client devices in the cluster and AP2 110 is computed. For AP6 130, the average of distance between the four closest client devices in the cluster and AP6 130 is computed.

At this stage, the system has computed a set of the followings:
 (1) distance metric from each client device in a cluster to the closest AP;
 (2) K value indicating the number of cluster centroid; and
 (3) AP assignment to each client device cluster.

Thus, the system can randomly select K number of client devices for a predetermined number of times (e.g., 100 times). Then, the system can run the above processes. At the end of 100 times of computation, the system can compare the metric for all iterations (e.g., the 100 iterations) and determine the best metric solution as characterized by the lowest distance metric. Further, the system can store such information (e.g., best distance metric and K value as well as corresponding AP assignments) in a database.

Next, the system can change the value of K according to the outermost "for" loop in the method shown in Table 1 above and repeat the above process again. After looping through different K values, the system can identify the best AP selections and assignments for each of the K values, One objective of the disclosed solution is to see which APs provide the maximum impact for the client devices in a wireless network. Therefore, two controversial factors are to be balanced. One of the controversial factors is to reduce the number of high priority APs. The other of the controversial factors is to minimize the average distance between each client device in a cluster and the assigned AP for that cluster of client devices. As such, the information stored in the database is normalized and sorted after all the loops are completed.

After sorting the database records, the system can get a gradation of solutions, where the best K versus minimum normalized distance solution may be sorted at the top. The best solution signifies the K APs, which affect the client devices the most. Thus, these K APs can be assigned with high priority (or classified into a high priority layer of APs), and considered for certain enhancements. For example, traffic and/or QoS profiles may be created for APs in the high priority layer; APs in the high priority layer may have priority in selecting its operating channels from a group of feasible channels; etc.

In addition, power save enhancement, other traffic related weights for client devices, or client health parameters can be added in addition to or in lieu of the average distance as the metric in the example method disclosed above.

Figure 2:
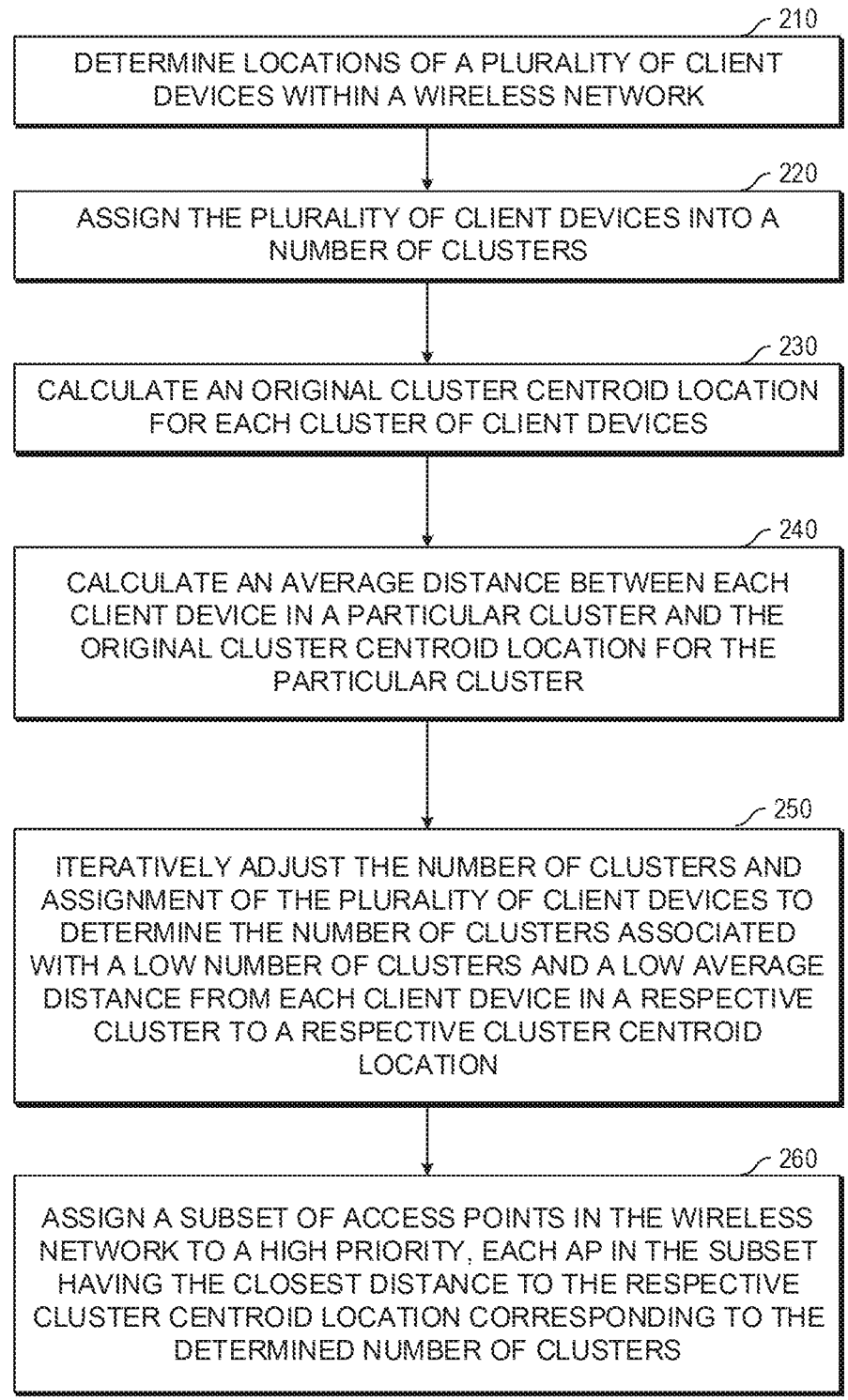
FIG. 2 is a flowchart of an example process of assigning a subset of access points in a wireless network to a high priority.

Processes of Assigning a Subset of Access Points in a Wireless Network to a High Priority FIG. 2 is a flowchart of an example method (e.g., process) of assigning a subset of access points in a wireless network to a high priority. During operations, a network device (e.g., a server or network controller) can determine a plurality of client devices' locations within a wireless network (operation 210). Then, the network device can assign the plurality of client devices into a number of clusters (operation 220). Next, the network device can calculate an original cluster centroid location for each cluster of client devices (operation 230). Further, the network device can calculate an average distance between each client device in a particular cluster and the original cluster centroid location for the particular cluster (operation 240). Also, the network device can iteratively adjust the number of clusters and assignment of the plurality of client devices to determine the number of clusters associated with a low number of cluster and a low average distance from each client device in a respective cluster to a respective cluster centroid location (operation 250). Moreover, the network device can assign a subset of access points in the wireless network to a high priority, whereas each AP in the subset has the closest distance to the respective cluster centroid location corresponding to the determined number of clusters (operation 260).

In some examples, the network device can further assign each client device in the plurality of client devices to a cluster whose cluster centroid location is closest to the location of the each client device.

In some examples, the network device iteratively adjusts the number of clusters and the assignment of the plurality of client devices using K-means clustering. The K-means clustering may aim to partition N observations into K clusters, in which each observation belongs to the cluster with the nearest mean, serving as a prototype of the cluster.

In some examples, while assigning the plurality of client devices into the number of clusters, the network device can randomly select a subset of client devices from the plurality of client devices, wherein a total number of selected client devices equals to the number of clusters; associate each of remaining client devices to one client device in the subset that is closest in distance to each respective remaining client device; and for each client device in the selected subset, identify associated remaining client devices as belonging to the same cluster of client devices, In some examples, the network device can further give each client device in the plurality of client devices a weight value based on a client parameter. If a respective client device has a high weight value, the network device can select the respective client device frequently into the subset of client devices.

In some examples, the network device can determine a closest cluster centroid location for each of the plurality of client devices; associate each respective client device to a new cluster whose centroid location has closest distance to the each respective client device; and calculate a new cluster centroid location based on client devices associated to the new cluster.

In some examples, the network device further can determine whether a distance between a respective new cluster centroid location and original cluster centroid location is less than a predetermined threshold. If a distance between a respective new cluster centroid location and original cluster centroid location is less than a predetermined threshold, the network device can assign the high priority to the subset of access points having closest distance to each new cluster centroid location.

In some examples, the subset of access points may be (1) associated with a high priority traffic profile, (2) associated with a high priority Quality-of-Service (QoS) profile, and (3) given priority for selecting their operating channels.

Network Device to Assign a Subset of Access Points in a Wireless Network to a High Priority As used herein, a network device may be implemented, at least in part, by a combination of hardware and programming. For example, the hardware may comprise at least one processor (e.g., processor 310) and the programming may comprise instructions, executable by the processor(s), stored on at least one machine-readable storage medium (e.g., 320). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

Figure 3:
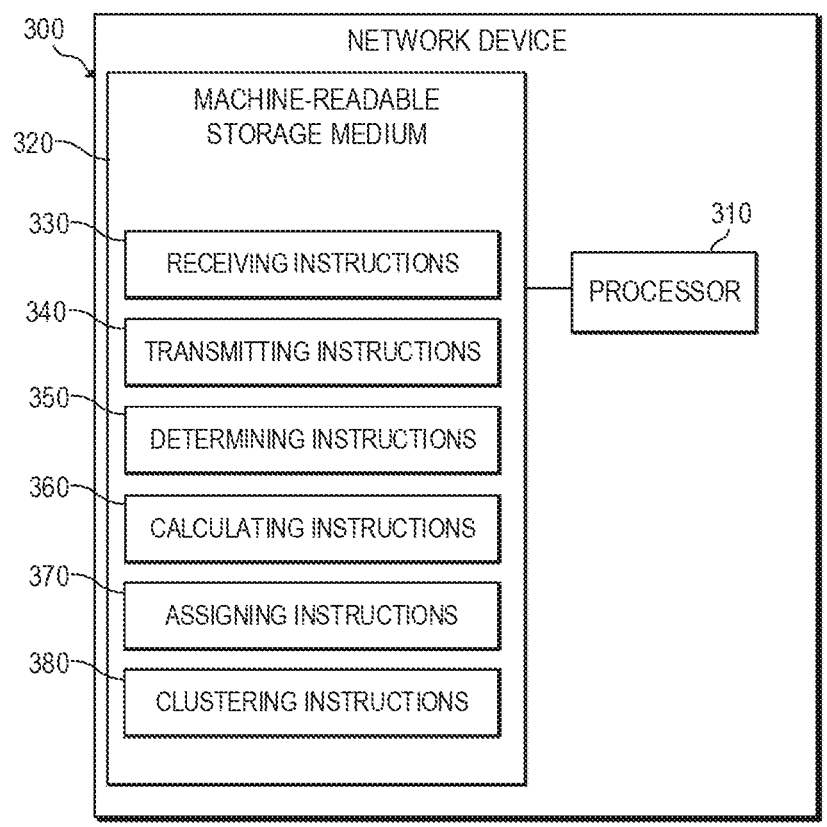
FIG. 3 is a block diagram of an example network device to assign a subset of access points in a wireless network to a high priority.

The at least one processor 310 may fetch, decode, and execute instructions stored on storage medium 320 to perform the functionalities described below in relation to instructions 330-380. In other examples, the functionalities of any of the instructions of storage medium 320 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 3, storage medium 320 may be implemented by one machine-readable storage medium, or multiple machine-readable storage media.

Although network device 300 includes at least one processor 310 and machine-readable storage medium 320, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 330-380 may be executed by processor 310 to: determine locations of a plurality of client devices within a wireless network; assign the plurality of client devices into a number of clusters; calculate an original cluster centroid location for each cluster of client devices; calculate an average distance between each client device in a particular cluster and the original cluster centroid location for the particular cluster; iteratively adjust the number of clusters and assignment of the plurality of client devices to determine the number of clusters associated with a low number of clusters and a low average distance from each client device in a respective cluster to a respective cluster centroid location; assign a subset of access points in the wireless network to a high priority, each AP in the subset having the closest distance to the respective cluster centroid location corresponding to the determined number of clusters; assign each client device in the plurality of client devices to a cluster whose cluster centroid location is closest to the location of the each client device; iteratively adjust the number of clusters and the assignment of the plurality of client devices using K-means clustering; etc.

Moreover, instructions 330-380 can be executed by processor 310 further to: randomly select a subset of client devices from the plurality of client devices, wherein a total number of selected client devices equals to the number of clusters; associate each of remaining client devices to one client device in the subset that is closest in distance to each respective remaining client device; for each client device in the selected subset, identify associated remaining client devices as belonging to the same cluster of client devices; give each client device in the plurality of client devices a weight value based on a client parameter; select the respective client device frequently into the subset of client devices in response to a respective client device having a high weight value; determine a closest cluster centroid location for each of the plurality of client devices; associate each respective client device to a new cluster whose centroid location has closest distance to the each respective client device; calculate a new cluster centroid location based on client devices associated to the new cluster; determine whether a distance between a respective new cluster centroid location and original cluster centroid location is less than a predetermined threshold; assign the high priority to the subset of access points having closest distance to each new cluster centroid location in response to a distance between a respective new cluster centroid location and original cluster centroid location being less than a predetermined threshold; etc.

We claim:

1. A method comprising:
designating, by a network device, a plurality of client devices in a wireless network into one or more clusters;
determining, by the network device, a cluster centroid for each cluster based on a location of each of the plurality of client devices corresponding to the respective clusters;
associating, by the network device, an access point in the wireless network with each of the one or more clusters based on location of each of the plurality of client devices and the cluster centroid for each cluster;
assigning, by the network device, a subset of access points in the wireless network to a high priority based on a distance between the access point for a cluster and the cluster centroid for the cluster.

2. The method of claim 1, wherein the access point in the wireless network associated with each of the one or more clusters is associated with a cluster based on a distance of the access point to the cluster.

3. The method of claim 2, wherein the distance is to a centroid of the cluster.

4. The method of claim 3, further comprising:
iteratively adjusting a number of the one or more clusters to identify a best subset of access points.

5. The method of claim 1, wherein clustering does not use K-means clustering.

6. The method of claim 1, further comprising:
turning off radios of access points in the wireless network not in the subset.

7. The method of claim 1, wherein the subset of access points are associated with a high priority traffic profile.

8. A network device, comprising:
a memory;
a processor executing instructions from the memory to:
designate a plurality of client devices in a wireless network into one or more clusters;
determine a cluster centroid for each cluster based on a location of each of the plurality of client devices corresponding to the respective clusters;
associate an access point in the wireless network with each of the one or more clusters based on location of each of the plurality of client devices and the cluster centroid for each cluster;
assign a subset of access points in the wireless network to a high priority based on a distance between the access point for a cluster and the cluster centroid for the cluster.

9. The network device of claim 8, wherein the access point in the wireless network associated with each of the one or more clusters is associated with a cluster based on a distance of the access point to the cluster.

10. The network device of claim 9, wherein the distance is to a centroid of the cluster.

11. The network device of claim 10, the processor further executing instructions from the memory to:
iteratively adjusting a number of the one or more clusters to identify a best subset of access points.

12. The network device of claim 8, wherein clustering does not use K-means clustering.

13. The network device of claim 8, further comprising:
turning off radios of access points in the wireless network not in the subset.

14. The network device of claim 8, wherein the subset of access points are associated with a high priority traffic profile.

15. A non-transitory machine-readable storage medium encoded with instructions executable by at least one processor of a network device, the machine-readable storage medium comprising instructions to:
designate a plurality of client devices in a wireless network into one or more clusters;
determine a cluster centroid for each cluster based on a location of each of the plurality of client devices corresponding to the respective clusters;
associate an access point in the wireless network with each of the one or more clusters based on location of each of the plurality of client devices and the cluster centroid for each cluster;
assign a subset of access points in the wireless network to a high priority based on a distance between the access point for a cluster and the cluster centroid for the cluster.

16. The non-transitory machine-readable storage medium of claim 15, wherein the access point in the wireless network associated with each of the one or more clusters is associated with a cluster based on a distance of the access point to the cluster.

17. The non-transitory machine-readable storage medium of claim 16, wherein the distance is to a centroid of the cluster.

18. The non-transitory machine-readable storage medium of claim 17, the processor further executing instructions from the memory to:
iteratively adjusting a number of the one or more clusters to identify a best subset of access points.

19. The non-transitory machine-readable storage medium of claim 15, wherein clustering does not use K-means clustering.

20. The non-transitory machine-readable storage medium of claim 15, further comprising:
turning off radios of access points in the wireless network not in the subset.

* * * * *